(12) United States Patent
Delteil

(10) Patent No.: US 11,592,088 B2
(45) Date of Patent: Feb. 28, 2023

(54) REMOVABLE FIXING DEVICE

(71) Applicant: AXENS, Rueil-Malmaison (FR)

(72) Inventor: Jauffray Delteil, Rueil-Malmaison (FR)

(73) Assignee: AXENS, Rueil-Malmaison (FR)

( * ) Notice: Subject to any disclaimer, the term of this patent is extended or adjusted under 35 U.S.C. 154(b) by 395 days.

(21) Appl. No.: 16/834,123

(22) Filed: Mar. 30, 2020

(65) Prior Publication Data

US 2020/0309237 A1    Oct. 1, 2020

(30) Foreign Application Priority Data

Mar. 29, 2019   (FR) .................................... 19/03.349

(51) Int. Cl.
| | | |
|---|---|---|
| F16B 2/18 | (2006.01) | |
| F16H 25/14 | (2006.01) | |
| F16B 5/02 | (2006.01) | |
| F16B 2/12 | (2006.01) | |

(52) U.S. Cl.
CPC ............ *F16H 25/14* (2013.01); *F16B 2/185* (2013.01); *F16B 5/0208* (2013.01); *F16B 2/12* (2013.01); *Y10T 403/595* (2015.01); *Y10T 403/7071* (2015.01)

(58) Field of Classification Search
CPC ........ F16B 2/18; F16B 2/185; Y10T 403/595; Y10T 403/7071
See application file for complete search history.

(56) References Cited

U.S. PATENT DOCUMENTS

| | | | | | |
|---|---|---|---|---|---|
| 2,375,409 | A | * | 5/1945 | Glitsch ..................... | F16B 5/06 261/114.5 |
| 2,916,272 | A | * | 12/1959 | Ragatz ................... | B01D 3/324 52/246 |
| 3,709,088 | A | * | 1/1973 | Pitzer ................... | F16B 19/1063 411/70 |
| 5,156,508 | A | * | 10/1992 | Grisley ..................... | B25B 5/08 411/432 |
| 5,158,331 | A | * | 10/1992 | Wesselski ............... | F16B 2/185 294/94 |
| 5,409,321 | A | * | 4/1995 | Chen ..................... | B62K 25/02 403/321 |
| 5,947,356 | A | * | 9/1999 | Delong ..................... | B60R 9/00 403/374.5 |

(Continued)

FOREIGN PATENT DOCUMENTS

FR   2 979 596   * 11/2013   ............... B60Q 1/26

*Primary Examiner* — Michael P Ferguson
(74) *Attorney, Agent, or Firm* — Millen, White, Zelano and Branigan, P.C.; Harry B. Shubin

(57) ABSTRACT

A removable fixing device 1 for fixing equipment A on a support B, with:

a compressible planar piece 5, an operating lever comprising a cam lever 2, and an assembly rod 3 having a first end and a second end; with:

the second end of the assembly rod 3 being provided with a tightening means (4);

the compressible planar piece 5, said operating lever comprising a cam lever 2 and the tightening means 4 arranged in tightened position being disposed around the assembly rod 3 in an assemblage;

said operating lever comprising a cam lever 2 being arranged so that a rotation of the cam lever 2 about an axis y at right angles to the axis z of the assembly rod 3 induces a displacement of the cam lever 2 between a tightened position and a loosened position.

19 Claims, 4 Drawing Sheets

(56) References Cited

U.S. PATENT DOCUMENTS

| | | | | |
|---|---|---|---|---|
| 6,004,064 A | * | 12/1999 | Franz | B62K 25/02 |
| | | | | 403/374.1 |
| 6,277,069 B1 | * | 8/2001 | Gray | A61B 17/02 |
| | | | | 600/234 |
| 2018/0058485 A1 | * | 3/2018 | Levesque | E04B 1/38 |

* cited by examiner

REMOVABLE FIXING DEVICE

TECHNICAL FIELD

The subject of the invention is a removable fixing device for fixing equipment on its support for equipment intended to be disposed in an enclosure. The removable fixing device relates notably to equipment of internal type likely to be installed in a reactor, in a balloon tank or in a column. The removable fixing device according to the invention is typically used in the field of chemistry, biochemistry, refining or petrochemistry for enclosures in which chemical, biochemical, physical or physical-chemical processes are implemented, by possibly implementing a granular bed.

PRIOR ART

In the enclosures of reactor, balloon tank or distillation column type, various equipment is installed, usually referred to as "internals". The installation of each of these equipment items requires a suitable support mechanically fixed to the enclosure, composed for example of a beam or of a complete or partial support ring, on which the equipment is placed then mechanically fixed using a fixing device.

Such equipment is used, for example, to dispense or separate fluids or simply to support loose or structured lining or a bed of granular solids, such as, for example, catalyst.

The device relates, in particular, to the removable internals, that is to say the internals which are installed in the enclosure prior to startup and which have to be able to be uninstalled, for example, when there are maintenance operations. The removable internals concerned can be, for example, gas or liquid or combined gas and liquid dispensers, or possibly distribution trays capable of dispensing the gas and the liquid at the head of a catalytic bed, or possibly distillation column trays, or more broadly, any other type of removable internal.

The device relates also to the removable parts of the fixed internals; that is to say the removable parts present on internals permanently installed in an enclosure. These are for example access hatches, called "manways", installed on a distillation column tray or on a distribution tray at the head of the catalytic bed or on a catalyst support grating or on any fixed internal which requires human intervention on a side of the internal that is not accessible.

More generally, the device according to the invention relates to any type of equipment, capable of being installed in an enclosure with its support and requiring a removable mechanical fixing device to fix it on said support.

A known removable fixing device consists, as described in the patent U.S. Pat. No. 7,931,871, in providing in the support, a part at right angles to the equipment, said part at right angles comprising at least one slit into which a key is inserted. Said key has an inclined top edge such that the key is forced and blocked inside the slit, for example using a hammer. Once blocked, said key keeps the equipment fixed. In a preferred embodiment, said key is formed by two plates welded at one end. The separation of these two plates at the non-welded end of the key, after insertion of the latter into the slit, ensures the tightening of the key and of the internal. This device is effective but loosening it can be improved.

Another fixing device, described in the patent application WO2018044476, makes it possible to couple a first and a second structure to one another via a stud positioned on the first structure and a body pivoting between a closed position and an open position positioned on the second structure. Said pivoting body has at least one opening which receives said stud when the body is in closed position. A pin on the stud makes it possible to fix the device. The mounting of this device requires perfect positioning of the two structures. Furthermore, the removal of this fixing device can also be improved.

The aim of the present invention is to add refinement to the prior art, by proposing an enhanced removable fixing device, the design of which notably renders the mounting and removal easier and faster, while ensuring an at least similar fixing efficiency.

SUMMARY OF THE INVENTION

The subject of the invention is a removable fixing device for fixing equipment on a support, the assembly comprising the equipment and said support being able to be disposed in an enclosure, such that said support comprises a planar part which extends in a plane P and which is at the interface with a complementary planar part belonging to said equipment and such that said device comprises:
  a compressible planar piece,
  an operating lever comprising a cam lever,
  and an assembly rod along an axis z having a first end linked mechanically to said planar part of the support and a second end.
Said removable fixing device is such that:
  said second end of the assembly rod is provided with a tightening means, capable of being arranged in tightened position;
  said compressible planar piece, said operating lever comprising a cam lever and said tightening means arranged in tightened position are successively disposed parallel to the plane P around said assembly rod and in an assemblage;
  said operating lever comprising a cam lever is arranged so that a rotation of the cam lever about an axis y at right angles to the axis z of the assembly rod induces a displacement of the cam lever between a tightened position in which the compressible planar piece is compressed and the assemblage is fixed, and a loosened position in which each element of said assemblage is removable.

"Each element of the assemblage" is understood to mean each of the different components that the assemblage comprises taken separately, that is to say the compressible planar piece, the operating lever and the tightening means but also any other additional component which might be included in the assemblage such as, for example, a removable washer.

"Around the rod" is understood to mean all the possible implementations of an element of the assemblage in the space surrounding the assembly rod, while being capable of being held by the fixing device, including the following five possibilities:
  Firstly, said element is passed through by said assembly rod in an orifice or a cutout of said element, the section of the cutout or of the orifice being advantageously strictly greater than the section of the assembly rod, typically by at least 5% and by at most 10%, said element being able to be composed of several adjacent parts.
  Secondly, the outer edge of said element tangentially backs up the outer surface of the rod.
  Thirdly, the outer edge of said element is slightly remote from the assembly rod and preferentially parallel to the tangent to the outer surface of the rod.
  Fourthly, said element comprises a tubular part into which the assembly rod is inserted.

Fifthly, said element is wound around the assembly rod.

Thus, each of the elements of the assemblage can be held by the fixing device, notably, by being passed through by said assembly rod or by tangentially backing up the outer surface of the rod or by being slightly remote from the assembly rod or by comprising a tubular part into which the assembly rod is inserted or by being wound around the assembly rod.

"Each element of said assemblage is removable" is understood to mean the fact that it is possible to undo the assemblage defined above in loosened position, each element being able to be separated from the others, which is notably the case of the operating lever.

Advantageously, the tightening means cooperates with the second end of the assembly rod only: it does not cooperate, notably, with the operating lever comprising the cam lever.

Advantageously, the manoeuvring of the cam lever is independent of the tightening means, so it is thus possible to switch the operating lever to loosened position while the tightening means remains in tightened position.

The device according to the invention exhibits a reduced loosening time and easier manoeuvring, since the loosening results from the switching of the operating lever from the tightened position to the loosened position and can be done manually. Likewise, the device according to the invention exhibits a reduced installation time. It is easier to manoeuvre, since the tightening results from the switching of the operating lever from the loosened position to the tightened position.

In a preferred variant of the device according to the invention, said cam lever of the operating lever comprises two parallel identical cams, mounted with rotary link about the axis y on a two-branch fork, each of the cams being situated on either side of said fork. Each of the cams comprises, on its outer surface, at least one point of contact M with an element of the assemblage, said point M being displaced on said element and on the outer surface of said cam, during the displacement of the cam lever from the tightened position to the loosened position.

This element of the assemblage which is in contact with the cams is preferentially the compressible planar piece or possibly an optional washer placed between the compressible planar piece and the cam lever.

In this variant, the two-branch fork makes it possible to position the lever around the assembly rod very easily during mounting, and facilitates removal. Furthermore, the two parallel cams spaced on either side allow for a distribution of the load on either side of the fork.

Preferentially, said two-branch fork, positioned between the two cams of the double-cam lever, has a U or omega Ω or C form or the form of a fork with two teeth. Thus, the fork can be mounted and removed very easily around the assembly rod.

In this variant of the device according to the invention, the outer surface of each of the cams preferentially comprises a first part and a second part such that:
  when the cam lever is in tightened position, said first part of the outer surface of the cam is in contact with an element of the assemblage at a distance d relative to the axis y and said first part of the outer surface of the cam compresses the compressible planar piece;
  during the displacement of the cam lever between the tightened position and the loosened position, said second part of the outer surface of the cam is in contact with an element of the assemblage at at least one point M which changes in approaching the axis y;
  when the cam lever is in the loosened position, the distance e between said point M and the axis of rotation y is chosen so that each element of the assemblage is removable.

"Which changes in approaching the axis y" is understood to mean the fact that, when the cam lever moves between the tightened position and the loosened position, said second part of the outer surface of the cam is in contact with the assemblage at at least one point M such that the distance e between said point M and the axis of rotation y is less than the distance d.

In this variant, said first part of the outer surface of the cam compresses the compressible planar piece either directly, or via one or more mechanical pieces inserted between the operating lever and the compressible planar piece. In this variant, the distance e between the point of contact M of the cam with an element of the assemblage and the axis y is chosen strictly less than the distance d such that a gap 6 between the operating lever and the tightening means allows each element of the assemblage to be removable when the cam lever is in loosened position. The gap 6 is preferentially greater than or equal to 0.2 mm, more preferentially greater than or equal to 0.5 mm and preferentially less than or equal to 5 mm.

Thus, the combination of the first part with the second part of the outer surface of each cam is perfectly adapted for the cam lever to keep the assemblage fixed when the cam lever is in tightened position, and each element of the assemblage to be removable when the cam lever is in loosened position.

In this variant of the device according to the invention, the first part of the outer surface of each of the two parallel cams of said cam lever is preferentially rectilinear and the outer planar surface of said cams on the first part of the outer surface is in contact with an element of the assemblage when the cam lever is in tightened position. In this variant, the assemblage is kept well fixed, even when it is subjected to fluctuations or variations of pressure linked to the fluctuations of the operating conditions in the unit/installation (pressure, temperature, flow rate and nature of the fluid used in the method).

In this variant of the device according to the invention, the second part of the outer surface of ach of the two parallel cams of said cam lever is preferentially curved, and more preferentially of elliptical or polynomial or off-centre circular form.

In this variant, the movement of the cam lever changes progressively with continuity of contact ensuring an optimal operation of the removable fixing device.

Preferentially, each of said cams of the cam lever is symmetrical according to a symmetry on a plane P' at right angles to said cams and comprising the axis of rotation of the cam lever y. Thus, the operating lever does not have a mounting direction and can be disposed in the assemblage in both directions without preference, which simplifies mounting for the operator, and does not require the addition of a polarizing device.

Preferentially, the second part of the outer surface of each of the cams is elliptical according to an ellipse of centre O.

In this variant, said centre O is advantageously off-centre by a distance b relative to the axis y of rotation of the cam towards the point of contact M. In this variant, the off-centre position of the centre of the ellipse requires a force to be applied to displace it to the loosened position. Thus, the off-centre position makes it possible to keep the cam lever in tightened position.

Advantageously, the cam lever comprises a manual gripping means or a motorized lever manoeuvring means. Thus, the cam lever of the operating lever can comprise a handle or an end intended to receive an extension in order to be manoeuvred directly by the hand of the operator. Similarly, the cam lever can be connected to a motorized device ensuring, by command, the switching of the lever from the tightened position to the loosened position and vice-versa.

Advantageously, the device according to the invention is such that said tightening means in tightened position is adjustable to adjust the tightening torque on the assembly rod when the operating lever comprising a cam lever is in tightened position. Thus, it is possible to finely adjust the tightening torque of the removable fixing device.

Advantageously, the tightening means consists of a nut mounted on a threaded part of the assembly rod in the second end of said rod.

Advantageously, the device according to the invention comprises an optional washer, and advantageously in the form of a U or Ω to be easily removable, capable of being arranged in the assemblage between the operating lever and the compressible planar piece.

In a preferred variant, a washer is arranged in the assemblage between the operating lever comprising a cam lever and the compressible planar piece.

Another subject of the invention is an assembly comprising (notably composed of) equipment, a support and the removable fixing device according to any one of the variants described above, such that the complementary planar part of said equipment is arranged around the assembly rod parallel to the plane P, below said operating lever comprising a cam lever and above the planar part of said support, preferentially above the compressible planar piece.

"Above" and "below" should be understood with reference to the components concerned in their mounting/operating position.

Another subject of the invention is an assembly comprising (notably composed of) an enclosure, equipment, a support and the removable fixing device according to any one of the variants described above, such that said enclosure is chosen from among a reactor, a balloon tank, a distillation column, an extraction column, an absorber, preferentially implementing chemical or physical-chemical reactions in the field of chemistry, petrochemistry, biochemistry or refining.

Another subject of the invention is a method for installing the assembly described above, said method comprising the following steps:
positioning the compressible planar piece parallel to the planar part of the support around the assembly rod;
positioning the complementary planar part of the equipment parallel to the compressible planar piece around the assembly rod;
positioning the operating lever parallel to the complementary planar part of the equipment around the assembly rod;
positioning the tightening means arranged in tightened position parallel to the operating lever comprising a cam lever around the assembly rod;
optionally positioning a washer between the operating lever comprising a cam lever, such that said washer is placed around the assembly rod above the complementary planar part of the equipment;
rotating the cam lever of the operating lever about the axis y at right angles to the axis z of the assembly rod in order to displace said cam lever between a loosened position, in which each element positioned previously is removable, and a tightened position in which the compressible planar piece is compressed and each element is fixed;
optionally adjusting the tightening torque by acting on the tightening means.

The method thus described is perfectly suitable for installing the assembly comprising equipment, a support and a removable fixing device according to any one of the variants described above.

DETAILED DESCRIPTION

Advantageously, the assembly rod extends along an axis z which is at right angles to the plane P in which the planar part of the support extends.

Advantageously, the assembly rod section is of circular or oval or rectangular or square form, preferentially of circular form.

Advantageously, the first end of the assembly rod is linked mechanically with the support by welding or by a nut or by any other mechanical link known to the person skilled in the art.

Advantageously, said compressible planar piece is a seal which can be of the ceramic fibre braid, or felt type or a pad provided with a non-adhesive coating of Teflon® type. The braid can be wound around the assembly rod.

Advantageously, said compressible planar piece can be in one or more parts.

Advantageously, said compressible planar piece is of disc or rectangular form provided with an orifice capable of receiving the assembly rod.

Advantageously, the tightening means of the removable fixing device according to the invention makes it possible to adjust the height of the fixing device. That makes it possible to fix equipment of variable thickness.

Advantageously, each of the elements of the assemblage is in contact with the element which follows it or which precedes it either directly or via a mechanical piece inserted between the element which follows it or precedes it and said element.

Advantageously, in the variant of the device in which the operating lever comprises a two-branch fork, said two-branch fork is provided with two axes added laterally onto each of the branches on the axis y, onto which the cam lever is mounted with rotary link.

Advantageously, in this variant, the height h of the two-branch fork is strictly less than the width W of the cams, preferentially is greater than or equal to 5 mm and less than or equal to 50 mm. Thus, the removable fixing device is compact in tightened position.

Advantageously, in the variant of the device in which the cam lever comprises two identical and parallel cams and a tightening nut, said cams of the cam lever are spaced apart by a distance L greater than or equal to the diameter of the nut tightening tool, preferentially with an additional gap greater than or equal to 1 mm, and less than or equal to 100 mm, preferentially less than or equal to 10 mm.

Advantageously, in this variant, when the first part of the outer surface of each of the two cams is rectilinear, the length of said first rectilinear part is greater than or equal to 5 mm, preferentially greater than or equal to 10 mm and less than or equal to 60 mm, preferentially less than or equal to 50 mm.

Advantageously, in this variant, when the second part of the outer surface of each of the cams is curved, said curve is such that each element of the assemblage is removable, even when the tightening means is in tightened position.

Advantageously, in this variant, when the second part of the outer surface of each of the cams of the cam lever is elliptical, the large diameter of the ellipse is greater than or equal to 10 mm, preferentially greater than or equal to 15 mm and less than or equal to 60 mm, preferentially less than or equal to 50 mm. Advantageously, the small diameter of the ellipse is greater than or equal to 7 mm, preferentially greater than or equal to 12 mm and less than or equal to 45 mm, preferentially less than or equal to 35 mm.

Advantageously, in this variant, when the second part of the outer surface of each of the cams of the cam lever is elliptical, according to an ellipse of centre O, said centre O is off-centre by a distance b greater than or equal to 0.5 mm, preferentially greater than or equal to 1.0 mm, and/or preferentially less than or equal to 5.0 mm, more preferentially less than or equal to 3.0 mm, towards the point of contact M.

Advantageously, when the cam lever comprises a manual gripping means, said manual gripping means comprises a handle or any other ergonomic form allowing it to be gripped.

Advantageously, the washer optionally included in the device according to the invention has the form of a U or of a C or of a thin disc pierced at its centre with an orifice of a diameter greater than that of the assembly rod. Thus, the removable washer perfectly backs up the assembly rod once arranged around the two-branch fork, preferentially between the two-branch fork and the equipment to be fixed. The presence of the removable washer makes it possible to preserve the surface of the equipment.

Advantageously, said washer is manufactured from a flat metal sheet, of a thickness of preferentially between 1 and 10 mm, preferentially between 3 and 6 mm, typically 5 mm.

Advantageously, said removable fixing device according to the invention can be used for fixing in an enclosure to fix a removable internal onto a support fixed mechanically to said enclosure. Likewise, the removable fixing device according to the invention relates to the supported pieces to be held in place on a support piece.

Preferably, the assembly composed of the equipment and the support is disposed in an enclosure.

In a first variant of the assembly comprising the support, the equipment and the fixing device according to the invention, said equipment is composed of a single piece.

In a second variant of the assembly, alternative to the first, the equipment is composed in its complementary planar part of several juxtaposed parts. Advantageously, the different juxtaposed parts are fitted to one another so as to at least partially surround the assembly rod. In this second variant, the equipment can be composed of different parts which are held by a single removable fixing device.

Preferentially, all the elements of the removable fixing device are manufactured from sheets of a thickness and/or of metallurgy identical to the equipment, for which it will be installed.

Advantageously, the cam lever is composed of planar metal sheet elements, of a thickness of preferentially between 1 and 10 mm, preferentially between 3 and 6 mm, typically 5 mm.

Advantageously, all the elements of the device are metal.

Advantageously, the elements of the device are manufactured in stainless steel chosen notably from among stainless steel 304, 316 or 321, preferably stainless steel 321.

Advantageously, in the assembly composed of equipment, a support and a removable fixing device according to the invention, with the complementary planar part of said equipment arranged around the assembly rod, said complementary planar part of said equipment is arranged in the space surrounding the rod, while being able to be held by the fixing device, according to all the possible implementations, which include the following possibilities, as mentioned previously:

Firstly, said complementary planar part is passed through by said assembly rod in an orifice or a cutout, the section of the cutout or of the orifice being advantageously strictly greater than the section of the assembly rod, typically by at least 5% and by at most 10%. In this case, the section of the orifice is more preferentially strictly greater than the section of the tightening means to make it possible to remove the equipment, while the tightening means is in tightened position.

Secondly, the outer edge of said complementary planar part tangentially backs up the outer surface of the rod.

Thirdly, the outer edge of said complementary planar part is slightly remote from the assembly rod and preferentially parallel to the tangent to the outer surface of the rod.

Fourthly, said complementary planar part comprises a tubular part into which the assembly rod is inserted.

Thus, said complementary planar part can be held by the fixing device notably, by being passed through by said assembly rod or by tangentially backing up the outer surface of the rod or by being slightly remote from the assembly rod or by comprising a tubular part into which the assembly rod is inserted.

Advantageously, in the assembly composed of equipment, a support and a removable fixing device according to the invention, the outer surface of each of the cams of the cam lever is preferentially in contact with the complementary planar part belonging to the equipment or possibly with a washer situated between said complementary planar part and the operating lever comprising a cam lever.

In all the present text, "support" is understood to mean a piece intended to be linked mechanically to the enclosure and adapted to support a given item of equipment. Generally, the support or supports are supplied with said equipment. They are typically support beams or rings or parts of support rings, linked mechanically to the enclosure directly or via other mechanical pieces.

Other features and advantages of the invention will be better understood and will emerge more clearly from the description of an embodiment of the invention, given hereinbelow, with reference to the figures given by way of example.

BRIEF DESCRIPTION OF THE DRAWINGS

FIG. 2b represents a top view and a side view of a part 9b of the cam lever represented in FIG. 2a.

DESCRIPTION OF THE EMBODIMENTS

Figure 1A:
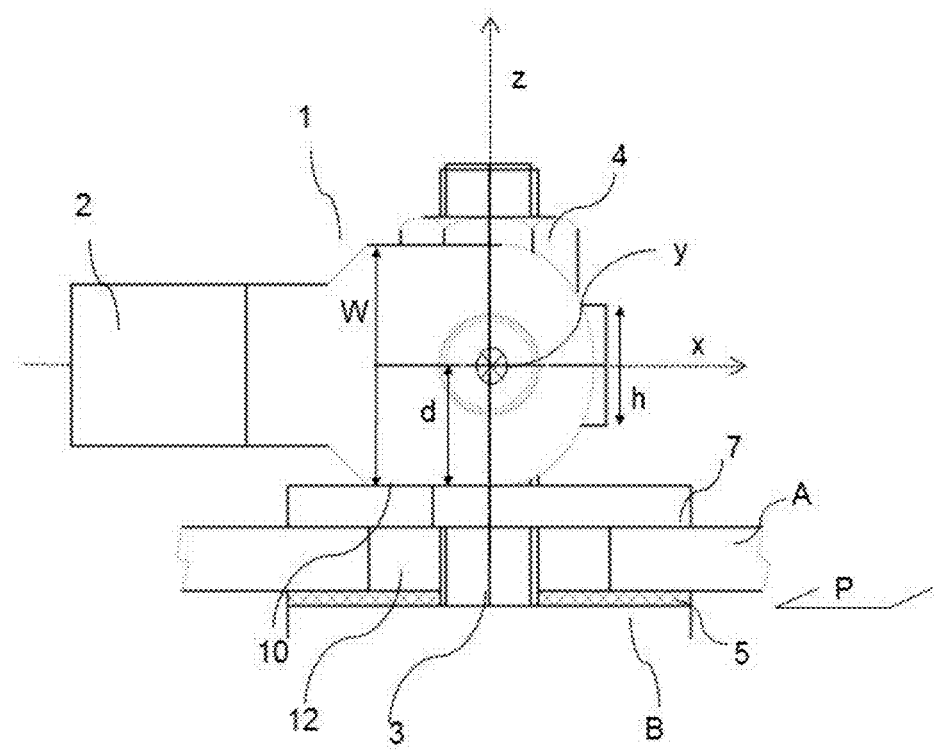
FIG. 1a represents a side view of the assembly comprising a removable fixing device (1) according to a first variant of the invention, of a planar part of a reactor internal (A) and of a beam (B).

The references represented in the figures are itemized below, in relation to the components to which they refer:
A—Reactor internal of tray type
B—Beam
1—Removable fixing device
2—Cam lever
3—Assembly rod
4—Tightening means
5—Compressible planar piece
6—Lateral axis
7—Optional washer
8—Two-branch fork
9a and 9b—Parts of the cam lever
10—First part of the outer surface of a cam
11—Second part of the outer surface of a cam
12—Cutout in the internal of tray type FIG. 1a represents a side view of the assembly comprising a removable fixing device 1 according to a first variant of the invention, for a planar part of a reactor internal of tray type A and a beam B, said device being intended to fix the planar part of the reactor internal of tray type A onto said beam B. Said internal is planar in the zone where the device is installed. The device 1 is represented with an operating lever comprising a cam lever 2 mounted on a two-branch fork 8. The removable fixing device 1 comprises an operating lever comprising a cam lever 2, an assembly rod 3, a tightening means composed of a nut mounted on a threaded part of the assembly rod 4 arranged in tightened position, a compressible planar piece 5 and an optional washer 7 in the form of a U. The reactor internal of tray type A is disposed between the compressible planar piece 5 and the cam lever 2, with an optional washer 7 between the latter two elements. The removable fixing device 1 is represented with the cam lever in tightened position: the first part of the outer surface of the cam 10 is rectilinear and is in contact with the washer 7 at a distance d relative to the axis y. In this position, the compressible planar piece 5 is compressed between the tray A and the beam B and the assembly is held fixed. The tray A comprises a cutout 12 through which the assembly rod 3 passes. Said cutout is of a section greater than the section of the bolt of the tightening means 4.

Figure 1B:
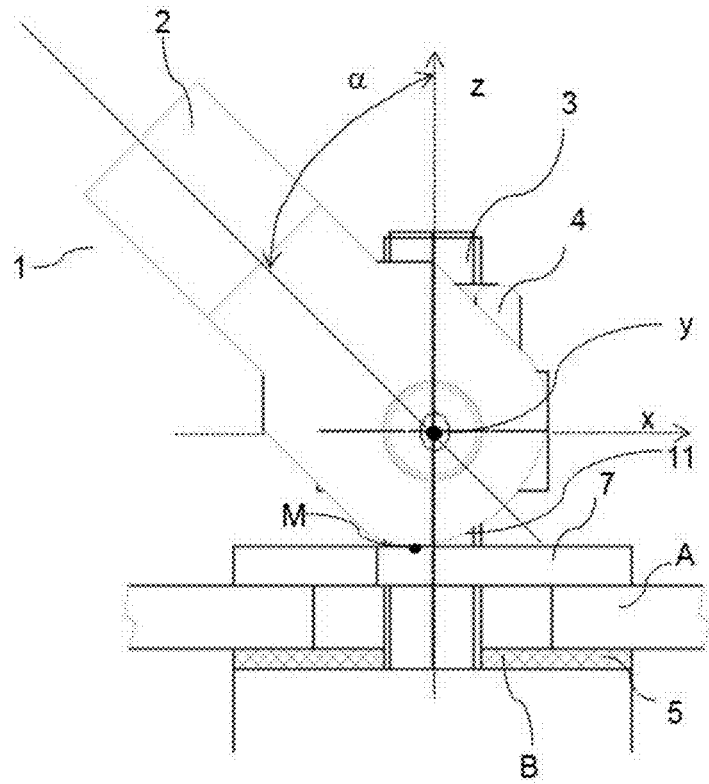
FIG. 1b represents a second side view of the assembly represented in FIG. 1a after rotation of the cam lever (2).

FIG. 1b represents a second side view of the assembly represented in FIG. 1a after rotation of the cam lever 2 about the axis y from the tightened position to an intermediate position in which the cam lever 2 forms an angle α less than 90 degrees with the axis z of the assembly rod 3, all the other elements of the device being immobile. The manoeuvre of the lever is effected without loosening the tightening means 4. In the intermediate position of the lever, the second part of the outer surface of each of the two cams 11 is in contact with the washer 7 at a point M which moves on the surface of the washer 7 and on the surface of each of the cams in approaching the axis y as the cam lever 2 approaches the loosened position which corresponds to the position in which the cam lever 2 is parallel to the axis z.

Figure 1C:
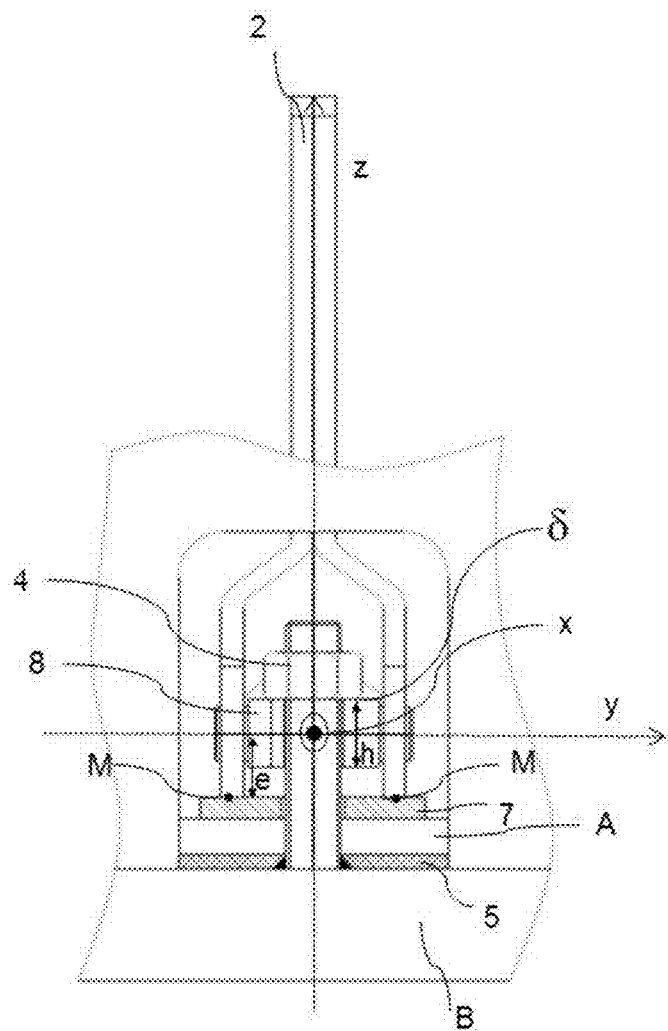
FIG. 1c represents a front view of the assembly represented in FIG. 1a with the cam lever (2) in loosened position.

FIG. 1c represents a front view of the assembly represented in FIGS. 1a and 1b after rotation of the cam lever 2 about the axis y from the intermediate position represented in FIG. 1b to a loosened position in which the cam lever 2 is parallel to the axis z of the assembly rod 3. When the cam lever is in the loosened position, each of the two cams of the cam lever 2 is in contact with the removable washer 7 at a point M. The distance e between said point M and the axis of rotation y is less than the distance d of FIG. 1a. The distance e is advantageously chosen to form a sufficient gap 6 between the top part of the two-branch fork 8 and the bottom part of the tightening means 4 in order for each element of the assembly to be removable. In this position of the cam lever 2, the compressible planar piece 5 is not compressed, the operating lever is removable, as are the tray A, the washer 7 and the compressible planar piece 5.

Figure 2A:
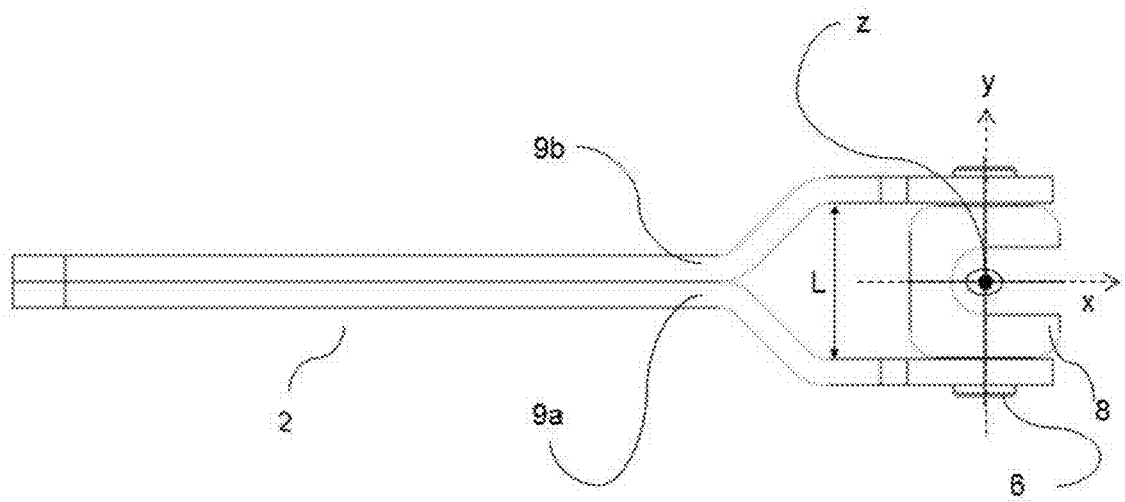
FIG. 2a represents a top view of the operating lever comprising a cam lever (2) and a two-branch fork (8) according to a variant of the invention.

FIG. 2a represents a top view of the operating lever comprising a cam lever 2 and a two-branch fork 8 according to a variant of the invention. Said two-branch fork 8 is in the form of a U, provided with an axis 6 on each of the lateral faces. Said axes allow the cam lever 2 to be mounted on the two-branch fork 8 with rotary link about the axis y. Said cam lever 2 is manufactured by joining two symmetrical parts to one another 9a and 9b and by welding them at one of their ends so as to form a handle. The other end of each part is composed of a cam. The two cams are spaced apart by a distance L.

Figure 2B:
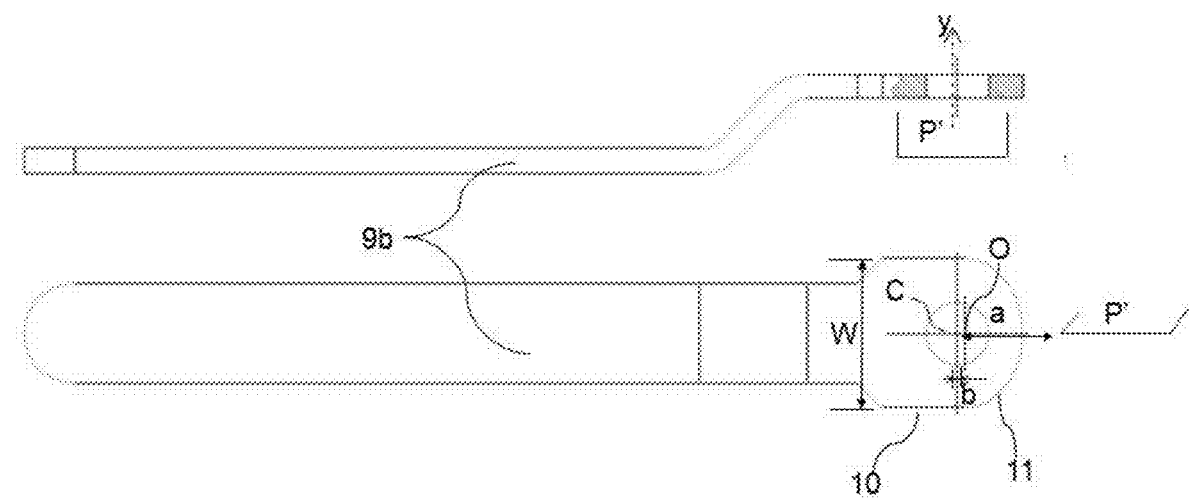

FIG. 2b represents a top view and a side view of the part 9b of the cam lever 2 represented in FIG. 2a. In this variant, the part 9b of the cam lever is symmetrical relative to the plane P'. P' is the plane at right angles to the part 9b which comprises the axis of rotation of the cam lever y. The outer surface of the cam comprises a first rectilinear part 10 and a second elliptical part 11, according to an ellipse of centre O. The distance a is chosen for a sufficient gap between the top of the cam lever and the bottom part of the tightening means to be created when the cam lever is in loosened position. The centre O of the ellipse is off-centre by a distance b relative to the point C through which the axis of rotation of the lever y passes.

Figure 3:
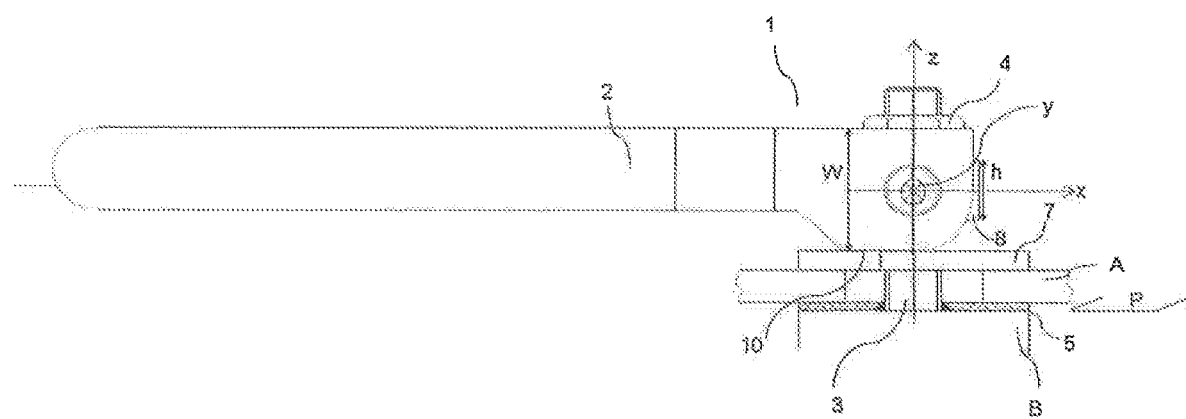
FIG. 3 represents a side view of an exemplary embodiment of a removable fixing device 1 according to another variant of the invention for fixing a tray A onto a beam B.

FIG. 3 represents a side view of an exemplary embodiment of a device for fixing a tray A onto a beam B in another variant of the invention. The removable fixing device 1 is manufactured in stainless steel SS321 like the tray A and the beam B. The device is used for a tray A with a thickness typically of between 6 and 20 mm. An assembly rod 3 with a diameter of 16 mm is welded onto the beam B at the location intended to receive the fixing device 1. The removable fixing device 1 comprises:
- a threaded rod 3 with a diameter of 16 mm,
- a nut 4 with a diameter corresponding to that of the threaded rod 3,
- a glass fibre seal 5 with a thickness of 3 mm, capable of being compressed,
- a removable washer 7 made of stainless steel with a thickness of 5 mm and in the form of a U,
- and an operating lever composed of a cam lever 2 comprising two identical and parallel cams mounted laterally on the two sides of a two-branch fork 8. The two-branch fork 8 has a height h of 20 mm, a width of 50 mm and a length of 50 mm. Each cam of the cam lever has a width W of 50 mm.

To install the device 1 of FIG. 3 and the tray A in the enclosure provided with the beam B onto which the end of the threaded rod 3 is welded, the operator typically proceeds as follows:
- he or she places the glass fibre seal 5 on the support B such that the threaded rod 3 passes through it,
- then, he or she positions the tray A such that the threaded rod 3 passes through the planar part of the tray A intended to be at the interface with the beam B,
- then, he or she places the two-branch fork 8 around the threaded rod 3, the cam lever 2 being in loosened position, that is to say along the axis z at right angles to the plane P, next, the operator moves the cam lever 2 to tightened position, that is to say with the cam lever 2 parallel to the plane P, then, if it is not yet installed, the operator screws on the nut 4, the operator can then optionally adjust the tightening torque.

When the cam lever 2 is in tightened position, the first part 10 of the outer surface of each of the cams of the cam lever 2 is in contact with the tray A over a length of 20 mm. The glass fibre seal 5 is therefore compressed between the tray A and the beam B. The tray A is fixed as are all the elements of the removable fixing device 1.

To remove the device 1 of FIG. 3 and the tray A from the enclosure, the operator typically proceeds as follows:

the operator moves the cam lever 2 from the tightened position to the loosened position, that is to say from the position in which the cam lever 2 is parallel to the plane P to the position in which the cam lever is at right angles to the plane P, then the operator removes the operating lever composed of the two-branch fork 8 and the cam lever 2, then, he or she removes the tray A, then, he or she removes the glass fibre seal 5, finally, the operator can possibly remove the nut 4.

In this example, the tray A is provided with an orifice with a section greater than the section of the nut 4.

In this example, a second part of the outer surface of each of the cams of the cam lever is elliptical, with an ellipse of ratio 2:1. This part makes it possible to loosen the cam lever in a continuous manner and to form a gap between the top part of the two-branch fork 8 and the bottom part of the nut 4, so as to be able to remove the device.

From all of the variants represented in the figures, it can be seen that the tightening means cooperates with the second end of the assembly rod only: it does not cooperate with the operating lever comprising the cam lever.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 19/03,349, filed Mar. 29, 2019, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A removable fixing device (1) fixing equipment (A) on a support (B), an assembly comprising said equipment and said support being able to be disposed in an enclosure, such that said support (B) comprises a planar part which extends in a plane (P) and which corresponds with a complementary planar part of said equipment (A), said device comprising:

an assembly rod (3) extending from the support along a rod axis (z) perpendicular to the plane and having a first end linked mechanically to said planar part of the support (B) and a second end;

a compressible planar piece (5) disposed between the planar parts of the support and the equipment, the compressible planar piece and the planar part of the equipment each having an open slot for receiving the assembly rod therethrough;

a two-branch fork (8) with an open slot defined between opposing teeth of the fork for receiving the assembly rod therethrough;

an operating lever comprising a earn lever (2), the cam ever comprising two parallel identical cams, each rotatably mounted on the fork about a lever axis (y) perpendicular to the rod axis (z) of the assembly rod, the cams being situated on outer sides of the fork on opposing sides of the slot; and a tightening means (4) provided on said second end of the assembly rod (3) capable of being arranged in a tightened position for applying a clamping force against the fork;

wherein said compressible planar piece (5), said planar part of the equipment (A), said fork (8), and said tightening means (4) arranged in the tightened position are successively disposed parallel to the plane (P) around said assembly rod (3) in an assemblage such that the tightening means applies a clamping force to the fork and the cams of the cam lever apply a clamping force to the planar part of the equipment to compress the compressible planar piece; and wherein said cam lever (2) is arranged so that a rotation of the cam lever (2) about the lever axis (y) induces a displacement of the cam lever (2) between a tightened position in which the compressible planar piece (5) is compressed and the assemblage is fixed, and a loosened position in which said assemblage is removable via removal of the assembly rod from the open slots of the fork, the equipment and the compressible planar piece.

2. The device according to claim 1, wherein each of the cams comprises, on its outer surface, a point of contact (M) with the equipment, said point (M) being displaced on said equipment and on the outer surface of said cam, during the displacement of the cam lever (2) from the tightened position to the loosened position.

3. The device according to claim 2, wherein said two-branch fork (8) has a U or C or omega form or the form of a fork with two teeth.

4. The device according to claim 2, wherein the outer surface of each of the cams comprises a first part (10) and a second part (11) such that:

when the cam lever (2) is in the tightened position, said first part of the outer surface of the cam (10) is in contact with the equipment at a distance (d) relative to the lever axis (y) and said first part of the outer surface of the cam compresses the compressible planar piece (5);

during the displacement of the cam lever (2) from the tightened position to the loosened position, said second part of the outer surface of the cam (11) is in contact with the equipment at least one point M which changes in approaching the lever axis (y); and when the cam lever is in the loosened position, the distance (e) between said point (M) and the lever axis (y) is chosen so that the assemblage is removable.

5. The device according to claim 4, wherein the first part of the outer surface of each of the two parallel cams of said cam lever (2) is rectilinear and the outer planar surface of said cams on the first part is in contact with the equipment when the cam lever (2) is in tightened position.

6. The device according to claim 4, wherein the second part of the outer surface of each of the two parallel cams of said cam lever (2) is curved.

7. The device according to claim 6, wherein the second part of the outer surface of each of the two parallel cams of said cam lever (2) is curved in elliptical, polynomial, or off-center circular form.

8. The device according to claim 4, wherein the second part of the outer surface of each of the cams is elliptical according to an ellipse of center O, such that said center O is advantageously off-center by a distance (b) relative to the axis (y) of rotation of the cam.

9. The device according to claim 2, wherein each of said cams of the cam lever (2) is symmetrical according to a symmetry on a plane (P') at right angles to said cams and comprising the axis of rotation of the cam lever (y).

10. The device according to claim 1, wherein the cam lever (2) comprises a manual gripping means or a motorized lever maneuvering means.

11. The device according to claim 1, wherein said tightening means (4) in the tightened position is adjustable to adjust the tightening torque on the assembly rod (3) when the operating lever comprising a cam lever (2) is in the tightened position.

12. The device according to claim 1, wherein the tightening means (4) consists of a nut mounted on a threaded part of the assembly rod (3) on the second end of said rod.

13. The device according to claim 1, wherein a washer (7) is arranged in the assemblage between the operating lever comprising a cam lever (2) and the compressible planar piece (5).

14. An assembly comprising equipment (A), a support (B) and the removable fixing device (1) according to claim 1, wherein the complementary planar part of said equipment is arranged around the assembly rod parallel to the plane (P) below said operating lever comprising a cam lever (2) and above the planar part of said support (B).

15. Method for installing the assembly according to claim 14, said method comprising the following steps:
positioning the compressible planar piece (5) parallel to the planar part of the support (B) around the assembly rod (3);
positioning the complementary planar part of the equipment (A) parallel to the compressible planar piece (5) around the assembly rod (3);
positioning the operating lever parallel to the complementary planar part of the equipment (A) around the assembly rod (3);
positioning the tightening means (4) arranged in tightened position parallel to the operating lever comprising a cam lever (2) around the assembly rod (3);
optionally positioning a washer (7) between the operating lever comprising a cam lever (2), such that said washer (7) is placed around the assembly rod (3) above the complementary planar part of the equipment (A);
rotating the cam lever of the operating lever (2) about the lever axis (y) at right angles to the axis (z) of the assembly rod (3) in order to displace said cam lever between a loosened position in which each element positioned previously is removable and a tightened position in which the compressible planar piece (5) is compressed and each element is fixed; and
optionally adjusting the tightening torque by acting on the tightening means (4).

16. The assembly according to claim 14, wherein the complementary planar part of said equipment is arranged around the assembly rod parallel to the plane (P) below said operating lever comprising a cam lever (2) and above the planar part of said support (B), above the compressible planar piece (5).

17. An assembly comprising an enclosure, equipment (A), a support (B) and the removable fixing device (1) according to claim 1, wherein said enclosure is a reactor, a balloon tank, a distillation column, an extraction column, or an absorber.

18. The assembly according to claim 17, wherein said reactor, balloon tank, distillation column, extraction column, or absorber implements a chemical or physico-chemical reaction in the field of chemistry, petrochemistry, biochemistry or refining.

19. A removable fixing device (1) fixing equipment (A) on a support (B), an assembly comprising said equipment and said support being able to be disposed in an enclosure, such that said support (B) comprises a planar part which extends in a plane (P) and which corresponds with a complementary planar part of said equipment (A), said device comprising:
an assembly rod (3) extending from the support along a rod axis (z) perpendicular to the plane and having a first end linked mechanically to said planar part of the support (B) and a second end;
a compressible planar piece (5) disposed between the planar parts of the support and the equipment, the compressible planar piece and the planar part of the equipment each having an open slot for receiving the assembly rod therethrough;
a two-branch fork (8) with an open slot defined between opposing teeth of the fork for receiving the assembly rod therethrough;
an operating lever comprising a cam lever (2), the cam lever comprising two parallel identical cams, each rotatably mounted on the fork about a lever axis (y) perpendicular to the rod axis (z) of the assembly rod, the cams being situated on outer sides of the fork on opposing sides of the slot; and
a tightening means (4) provided on said second end of the assembly rod (3) capable of being arranged in a tightened position for applying a clamping force against the fork;
wherein said compressible planar piece (5), said planar part of the equipment (A), said fork (8), and said tightening means (4) arranged in the tightened position are successively disposed parallel to the plane (P) around said assembly rod (3) in an assemblage such that the tightening means applies a clamping force to the fork and the cams of the cam lever apply a clamping force to the planar part of the equipment to compress the compressible planar piece; and
wherein said cam lever (2) is arranged so that a rotation of the cam lever (2) about the lever axis (y) induces a displacement of the earn lever (2) between a tightened position in which the compressible planar piece (5) is compressed and the assemblage is fixed, and a loosened position in which said assemblage is removable via removal of the assembly rod from the open slots of the fork, the equipment and the compressible planar piece;
wherein each of the cams comprises, on its outer surface, a point of contact (M) with the equipment, said point (M) being displaced on said equipment and on the outer surface of said cam, during the displacement of the cam lever (2) from the tightened position to the loosened position;

wherein the outer surface of each of the cams comprises a first part (10) and a second part (11) such that:

when the cam lever (2) is in the tightened position, said first part of the outer surface of the cam (10) is in contact with the equipment at a distance (d) relative to the lever axis (y) and said first part of the outer surface of the cam compresses the compressible planar piece (5);

during the displacement of the cam lever (2) from the tightened position to the loosened position, sad second part of the outer surface of the cam (11) is in contact with the equipment at least one point M which changes in approaching the lever axis (y);

when the cam lever is in the loosened position, the distance (e) between said point (M) and the lever axis (y) is chosen so that the assemblage is removable.

* * * * *